United States Patent [19]

McLean

[11] Patent Number: 4,685,863
[45] Date of Patent: Aug. 11, 1987

[54] TURBINE ROTOR ASSEMBLY
[75] Inventor: Howard J. McLean, North Palm Beach, Fla.
[73] Assignee: United Technologies Corporation, Hartford, Conn.
[21] Appl. No.: 52,633
[22] Filed: Jun. 27, 1979
[51] Int. Cl.[4] .................. F01D 11/00; F01D 5/18
[52] U.S. Cl. .................................... 416/95; 416/174
[58] Field of Search ............ 416/193 A, 95, 220, 416/221, 212 A, 174; 415/115, 172 A, 173 R, 139

[56] References Cited
U.S. PATENT DOCUMENTS

| 3,383,095 | 5/1968 | Anderson | 416/220 |
|---|---|---|---|
| 3,437,313 | 4/1969 | Moore | 415/115 |
| 3,761,200 | 9/1973 | Gardiner | 416/193 A |
| 3,850,546 | 11/1974 | Mason | 416/212 A |
| 3,853,425 | 12/1974 | Scalzo et al. | 416/95 |
| 3,923,420 | 12/1975 | Chifos | 416/193 A |
| 4,218,189 | 8/1980 | Pask | 416/174 |

FOREIGN PATENT DOCUMENTS

| 1953709 | 10/1969 | Fed. Rep. of Germany | 416/219 |
|---|---|---|---|
| 2312821 | 10/1973 | Fed. Rep. of Germany | 416/219 |
| 2345605 | 10/1977 | France | 416/193 A |
| 2358545 | 2/1978 | France | 416/193 A |

Primary Examiner—Leonard E. Smith
Attorney, Agent, or Firm—Gene D. Fleischhauer

[57] ABSTRACT

Components of a rotor assembly which is capable of long term reliable operation in an axial flow gas turbine engine environment are disclosed. Various construction details enabling good low cycle fatigue life by reducing stress concentrations in the rotor disk are disclosed. Rotor disk and blade features are combined to provide a seal land on the rotor assembly without the need of disk sideplates.

14 Claims, 2 Drawing Figures

TURBINE ROTOR ASSEMBLY

BACKGROUND OF THE INVENTION

1. Field of the Invention

This invention relates to axial flow, gas turbine engines and more specifically to a rotor assembly of such an engine.

2. Description of the Prior Art

In a gas turbine engine of the type referred to above, working medium gases are pressurized in a compressor section, burned with fuel in a combustion section and expanded through a turbine section. The flowpath for the working medium gases extends in an essentially axial direction. The working medium gases in the compressor and turbine sections flow alternatingly through rows of rotor blades and rows of stator vanes. Energy extracted from the rotor blades in the turbine section is mechanically carried to the rotor blades of the compressor section to enable pressurization of the incoming working medium.

A seal between each row of rotor blades and the adjacent rows of stator vanes is provided to prevent the leakage of working medium gases around the operative surfaces of the blades and vanes. At the inner diameter of the flowpath a seal, such as a labyrinth seal, is conventionally provided between each disk and blade assembly and the adjacent stationary structure by a first element extending from stationary structure and a second element extending of the disk and blade assembly. U.S. Pat. Nos. 2,945,671 to Petrie entitled "Bladed Rotor Constructions for Fluid Machines" and 3,703,808 to Sterns entitled "Turbine Blade Tip Cooling Air Expander" representatively illustrate such a labyrinth seal. Petrie shows the rotating seal element extending directly from the rotor disk; Sterns shows the rotating seal element extending from sideplates mechanically attached to the rotor disk at both the upstream and downstream sides thereof.

In modern gas turbine engines a collateral function of such seals within the turbine section is to confine rotor blade cooling air inwardly of the flowpath and to direct such cooling air to the rotor blades. Representative illustrations of turbine section structures include U.S. Pat. Nos. 3,635,586 to Kent et al entitled "Method and Apparatus for Turbine Blade Cooling"; 3,768,924 to Corsmeier et al entitled "Boltless Blade and Seal Retainer"; and 3,989,410 to Ferrari entitled "Labyrinth Seal System". In each of the above illustrated structures the rotating seal element extends from sideplates which are mechanically affixed to the respective rotor disks.

Mechanical attachment of the sideplates to the rotor disk and indeed the sideplates themselves add mechanical complexity to the rotor system. Effective rotor structures without the added mechanical complexity of sideplates are known to be desired. Two structures free of sideplates are illustrated in U.S. Pat. Nos. 3,437,313 to Moore entitled "Gas Turbine Blade Cooling" and 3,791,758 to Jenkinson entitled "Cooling of Turbine Blades". In both Moore and Jenkinson the rotating seal is formed of elements extending individually from each of the rotor blades. Neither the structural adequacy nor the sealing effectiveness of the above structures is known to the present patentee.

Notwithstanding knowledge of the above type structures, scientists and engineers in the gas turbine industry continually search for yet improved disk and blade structures.

SUMMARY OF THE INVENTION

A primary aim of the present invention is to provide a rotor assembly structure for a gas turbine engine. A simplified seal structure between rotating and stationary elements of the engine is sought. Specific objects include the removal of the need for rotor sideplates and the elimination of cooling air transmission holes below the live rim of the disk.

According to the present invention a rotor assembly of a gas turbine engine includes rotor blades having lugs which are adapted to extend axially away from the disk in which the blades are installed, and coextending disk lugs which in cooperation with the blade lugs form a cylindrical seal land.

According to one detailed embodiment of the invention, the rotor blade is of the coolable type having a hollow interior and a conduit for cooling air is formed at each blade beneath the extending blade lug for flowing cooling air to the hollow interior of the blade.

A primary feature of the present invention is the cylindrical seal land which is formed of alternating blade and disk lugs. The seal land thusly formed, eliminates in part the need for rotor sideplates. In one embodiment a cooling air conduit in the root section of each blade beneath the blade lug enables the flow of cooling air into the hollow interior of coolable rotor blades without need of penetrating the disk below the live rim.

Principal advantages of the invention include a rotor disk which is free of cooling air penetrations through the disk below the live rim and the avoidance of a need for rotor sideplates. Good low cycle fatigue characteristics of the disk and the blade assembly result. Another advantage of the present invention is the good tolerance of the formed seal land to rubbing interference. The land is free of tensile hoop stresses which tend to encourage the propagation of local, thermally induced cracks. Collaterally, bending of the lugs forming the seal land under centrifugally generating loads puts potential rub areas of the land into bending compression, further reducing the likelihood of crack propagation.

The foregoing, and other objects, features and advantages of the present invention will become more apparent in the light of the following detailed description of the preferred embodiment thereof as shown in the accompanying drawing.

DETAILED DESCRIPTION

Figure 1:
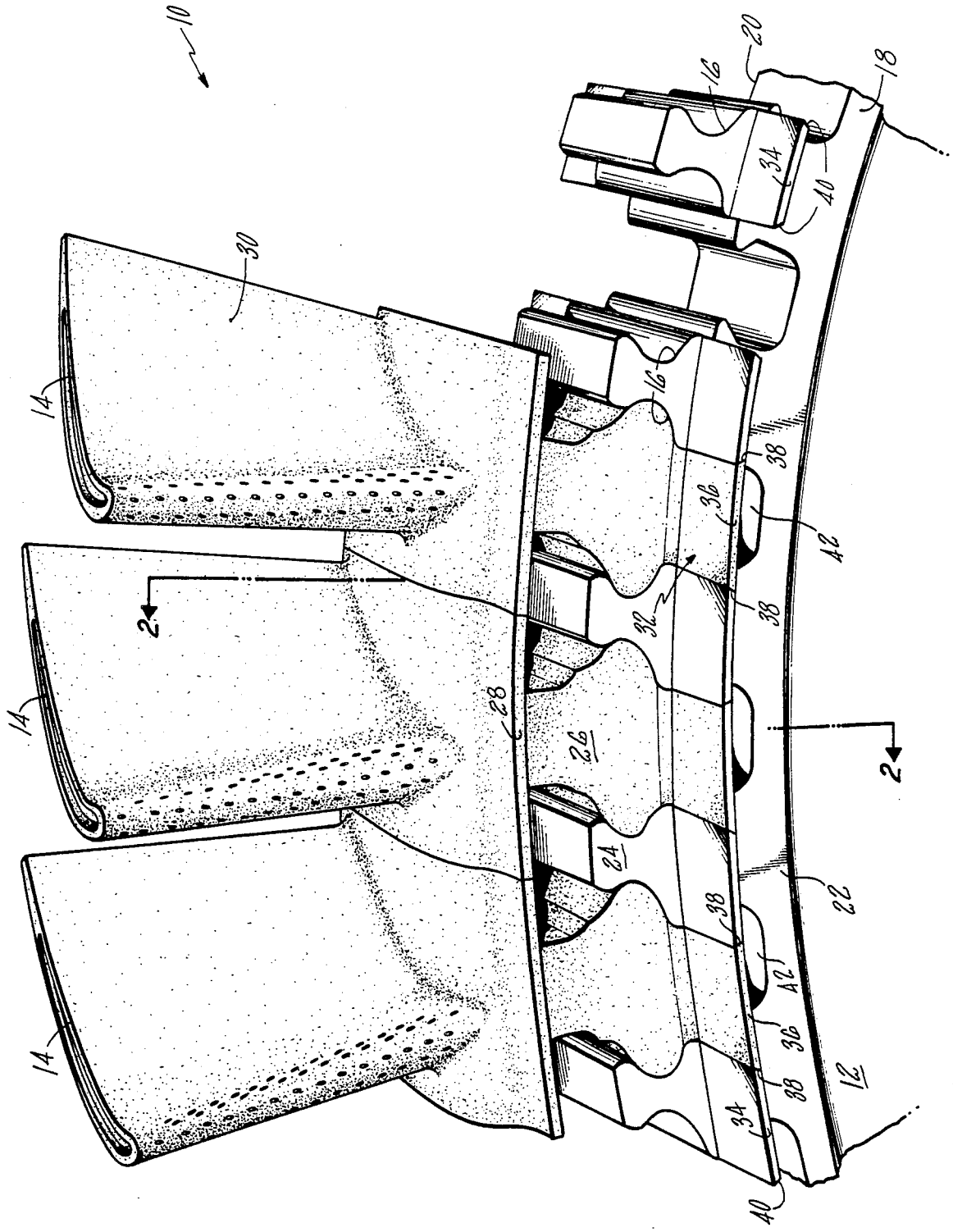
FIG. 1 is a simplified, partial perspective view of a portion of a rotor assembly incorporating the seal land of the present invention.

The concepts of the present invention are illustrated in the FIG. 1 perspective view of a portion of the rotor assembly 10 of a gas turbine engine. A turbine section embodiment is shown. The rotor assembly includes at least one rotor disk as represented by the single disk 12. A plurality of rotor blades 14 extend outwardly from the periphery of each rotor disk. The blades illustrated are of the coolable type and have a hollow cavity at the interior thereof.

A plurality of blade attachment slots 16 are formed at the periphery of the disk and extend axially from an upstream side 18 to a downstream side 20 of the disk. The region 22 of centrifugally continuous material inwardly of the attachment slots is referred to as the "live rim" of the disk. Circumferential, or hoop stresses are capable of being carried by the live rim material. The region 24 of the disk outwardly of the live rim is referred to as the "dead rim". Material in the dead rim is circumferentially interrupted by the attachment slots and is incapable of carrying circumferential, or hoop stresses. Each rotor blade has a root section 26, a platform section 28, and an airfoil section 30. The root sections are correspondingly shaped to the contour of the attachment slots and, in the geometry shown, resemble an inverted fir tree. The concepts of the present invention are not limited to the precise geometry shown.

A seal element 32 on the rotating structure is formed to extend laterally of the rotor disk. In the illustrated embodiment the element 32 is a seal land which is adapted to mate with a corresponding element of the stationary structure. The seal land is formed in composite of coextending disk lugs 34 and blade lugs 36. Each of the disk lugs extends laterally on the disk from an area between adjacent attachment slots 16. The lugs 34 are in the dead rim region of the disk. Each of the blade lugs 36 extend laterally from the root section 26 of a single rotor blade. The circumferential edges 38 of the blade lugs are canted to face in the radially outward direction. The circumferential edges 40 of the disk lugs are canted to face in the radially inward direction. Corresponding edges 40 of the disk lugs and edges 38 of the blade lugs are in opposing, abutting relationship. A conduit 42 in communication with the hollow interior of each blade is formed at the base of the root section 26 of each blade between the blade and the disk. In an alternate embodiment not specifically shown, the conduit is formed through the blade material alone.

Figure 2:
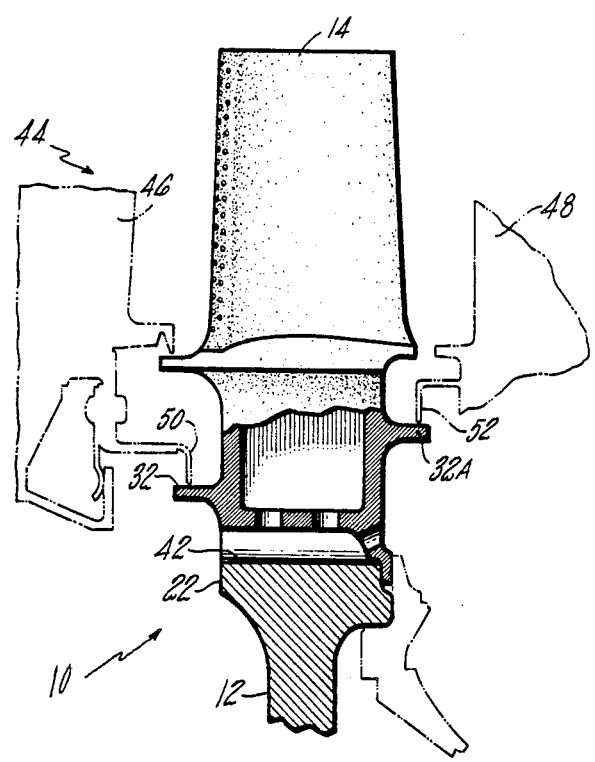
FIG. 2 is a simplified sectional view taken along the line 2—2 as shown in FIG. 1.

The rotor assembly 10 is shown in operative relationship to the stator assembly 44 of an engine in FIG. 2. The stator assembly includes an upstream row of stator vanes, as represented by the single vane 46, and a downstream row of stator vanes as represented by the single vane 48. A stationary seal element 50 extends on the stator assembly into operative relationship with the seal element 32 of the rotor assembly at the upstream side of the rotor disk 12. Similarly, a stationary seal element 52 extends on the stator assembly into operative relationship with a seal element 32A of the rotor assembly at the downstream side of the rotor disk. Single knife edge seals are shown although other seal types can be incorporated with equal facility depending upon the specific requirements of the engine in which the inventive concepts are incorporated.

During operation of an engine in which the above described hardware is installed the rotor spins relative to the stator at speeds of several thousand revolutions per minute. The blades 14 are restrained within the attachment slots 16 by the rotor disk 12. Extreme centrifugally generated loads develop and are carried by the disk material. Circumferential, or hoop loads are distributed in the disk material at and below the live rim of the disk. It is important to note that the disk of FIG. 2 is free of cooling air holes in the disk below the live rim. The absence of such cooling air holes avoids stress concentrations thereat and, thusly improves the low cycle fatigue life of the disk.

In response to centrifugally generated loads the blades are urged outwardly in the attachment slots such that the outwardly facing edges 38 of the blade lugs and the inwardly facing edges 40 of the disk lugs are held securely in sealing contact. In one embodiment the material from which the blade lugs are fabricated has a lower modulus of elasticity (E) than the modulus of elasticity of the material from which the disk lugs are fabricated. For example, the blades may be fabricated of a directionally solidified nickel base alloy such as that known within the industry as PWA-1422 (Mar-M-200+Hf) and the disk may be fabricated of a nickel base superalloy such as that known within the industry as PWA-1073 (In-100 Modified). In such an embodiment the blade lugs under centrifugally generated loads do bend more freely than the disk lugs such that sealing contact at the edges 38 and 40 is further encouraged.

The seal land 32 under centrifugally generated loads has good tolerance of rubbing contact with the opposing elements of the stator structure. The seal land being formed in composite of disk lugs and blade lugs carries no circumferential or hoop loads of the type which tend to encourage propagation of heat induced cracks in lands carrying such loads. Collaterally, circumferentially generated loads place the stator opposing surfaces of the lugs in bending compression which further discourages crack propagation.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. A rotor blade for a disk-blade rotor assembly of the axial flow gas turbine engine type having an upstream side and a downstream side and of the type having a cylindrical seal land adapted for opposition to a stator assembly of such an engine, the disk including a plurality of attachment slots extending across the periphery of the disk from the upstream to the downstream side which adapt the disk to receive the root of the rotor blade and having a lug extending laterally on the disk between each pair of adjacent attachment slots to form a portion of the seal land wherein the improvement comprises:

a lug extending laterally from the root of the rotor blade which is adapted to extend between the adjacent lugs and to form an annular portion of the seal land in conjunction with the adjacent disk lugs.

2. A bladed rotor and adjacent static structure for a gas turbine engine comprising:

a rotor disc having a plurality of blade retaining slots in its periphery;

a plurality of rotor blades each having a blade root mounted in one of said slots; and sealing means between the rotor and the adjacent static structure, said sealing means including an annular projection carried by the rotor adjacent said rotor disc periphery, and an annular projection carried by the static structure and arranged to coact with the annular projection carried by the rotor from adjacent said rotor disc periphery, said annular projection carried by the rotor from adjacent said disc periphery being defined by a plurality of abutting segments, alternate ones of which project from said rotor disc and said rotor blades respectively, said abutting segments having abutting faces angled in a direction relative to a radially extending plane through the axis of the engine whereby centrifugal forces on said rotor blades cause said abutting faces to be forced into sealing engagement.

3. A bladed rotor as claimed in claim 2 and in which said abutting faces of said segments are formed as continuations of the profile of said blade roots and said retaining slots.

4. A bladed rotor as claimed in claim 2 in which said rotor is a turbine rotor of a gas turbine engine.

5. A bladed rotor as claimed in claim 2 in which said annular projection carried by the rotor is spaced from said annular projection on said static structure.

6. For an axial flow engine having a turbine, a rotor assembly having an upstream side and a downstream side and of the type having a cylindrical seal land adapted for opposition to a stator assembly of such an engine, which includes the improved seal land structure comprising:
   a rotor disk having a plurality of attachment slots extending across the periphery of disk from the upstream to the downstream side and having a lug extending laterally on the disk between each pair of adjacent attachment slots; and
   a plurality of rotor blades, one blade extending from each slot and having a lug extending laterally on the rotor assembly between the adjacent disk lugs, forming said cylindrical seal land in conjunction with the disk lugs.

7. The invention according to claim 6 wherein each disk lug has a pair of circumferentially facing edges which are canted to face inwardly on the assembly and wherein each blade lug has a pair of circumferentially facing edges which are canted to face outwardly on the assembly, the outwardly facing edges of each blade lug being adapted to abut the inwardly facing edges of the adjacent disk lugs.

8. The invention according to claim 7 wherein the rotor blade lugs are fabricated from a material having a lower modulus of elasticity than the material from which the disk lugs are fabricated such that under centrifugally generated loads during rotation of the assembly the blade lugs ar urged outwardly against the disk lugs to encourage mechanical sealing between the outwardly facing edges of the blade lugs and the inwardly facing edges of the disk lugs.

9. The invention according to claim 3 or 13 wherein the blade lugs are fabricated of the nickel base superalloy PWA-1422 (MAR-M-200+Hf) and wherein the disk lugs are fabricated from the nickel base superalloy PWA-1073 (IN-100 Modified).

10. The invention according to claims 6, 7 or 8 wherein said disk and blade lugs extend laterally from the upstream side of the assembly.

11. The invention according to claims 6, 7 or 8 wherein said disk and blade lugs extend from the downstream side of the assembly.

12. The invention according to claims 6, 7 or 8
    wherein each of said blades is coolable and has a hollow interior portion and
    wherein a conduit for cooling air to the hollow interior is formed at the base of the root section of the blade radially inward of said blade lug.

13. The invention according to claim 12 wherein said hollow interior extends to the base of the root section and where said conduit is formed between the base of the root section and the attachment slot to which the blade is engaged, the conduit and hollow interior being in communication.

14. The invention according to claim 12 wherein said conduit comprises an axially extending hole in the root section which is in communication with the hollow interior.

* * * * *